Feb. 16, 1954  R. A. PFUNTNER  2,669,678
REMOTE INDICATING SYSTEM
Filed May 2, 1952
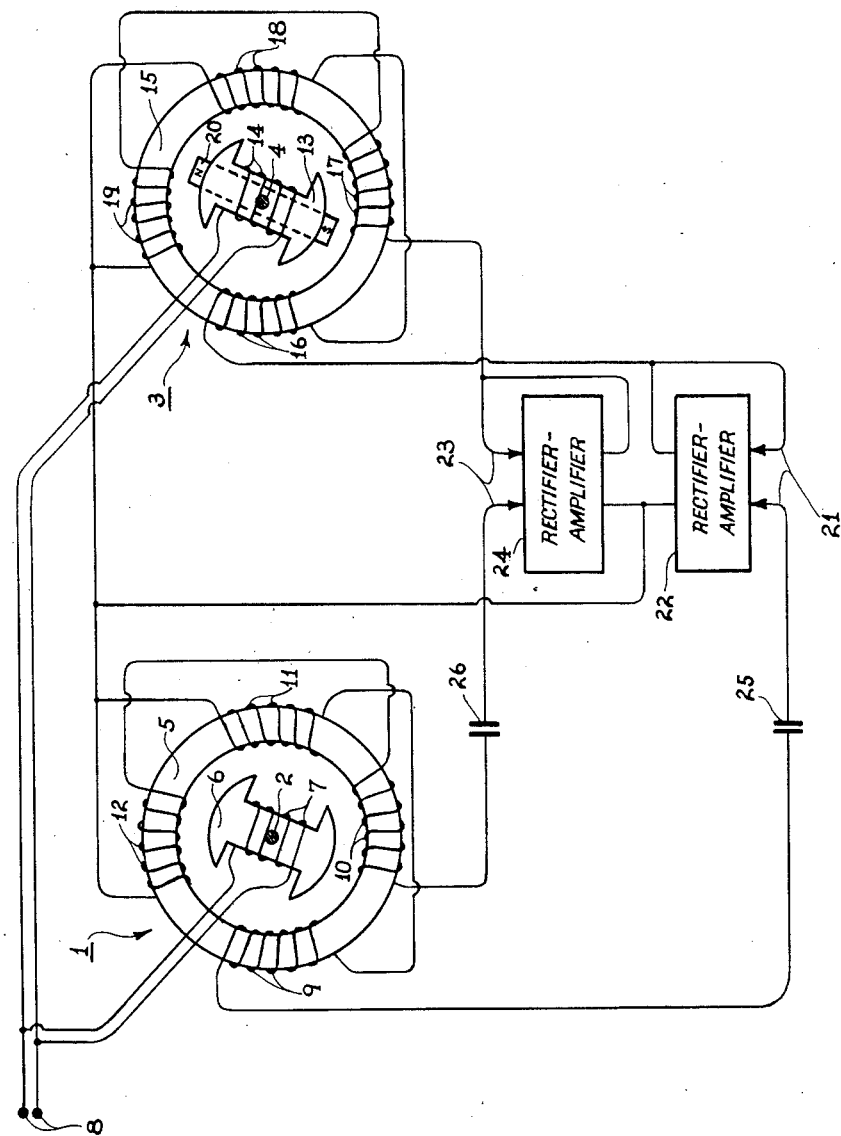
Inventor
RICHARD A PFUNTNER
by Russell C. Warner
His Attorney Patented Feb. 16, 1954

2,669,678

UNITED STATES PATENT OFFICE 2,669,678

REMOTE INDICATION SYSTEM

Richard A. Pfuntner, Saugus, Mass., assignor to General Electric Company, a corporation of New York Application May 2, 1952, Serial No. 285,604

5 Claims. (Cl. 318—24)

The present invention relates to telemetering and control systems and, more particularly, to electromechanical arrangements for reproduction of angular motion.

Servo and second harmonic telemetering systems are well known in this art as the conventional means for the reproduction of angular motion at a distance. Among the improvements sought for such arrangements are reduction in complexity and size of elements necessary to produce large output torques, increased accuracy of motion reproduction, and reduction of torques reflected on the input by the output devices. Such improvements are embraced within the instant invention which utilizes an electrical position transmitter, or pick-off, and a remote electrical position receiver, the transmitter and receiver elements being intercoupled through electrical rectifier-amplifier circuits. As appears more fully hereinafter, the receiver and transmitter elements are nearly identical in physical construction, and the receiver functions not only to reproduce angular motions of the transmitter but to detect and initiate automatic correction for errors in the position of the receiver rotor.

Accordingly, it is one object of the present invention to provide a motion reproducing system yielding large output torques with minimized torque reflections and with minimized system errors.

Further, it is an object to provide a motion repeating system wherein the receiver functions both as a receiver and a correspondence detector simultaneously.

These and additional objects and features of the subject invention are disclosed in detail in the following description wherein reference is made to the accompanying drawing in which one embodiment of a motion repeating system is illustrated in schematic form.

The motion translating arrangement depicted in the accompanying drawing comprises an electrical transmitter or pick-off 1, of which the rotor shaft 2 is angularly movable by a suitable intelligence input device, and an electrical receiver or motion repeater 3, of which the rotor shaft 4 is caused to move in angular correspondence with the transmitter rotor shaft 2 and to actuate a suitable intelligence output device. Transmitter 1 is a conventional type of two-phase pick-off which converts the angular relationship between the rotor shaft 2 and the stator core 5 into voltages characterizing these relationships in both phase and amplitude. The rotor or primary of the pick-off is comprised of a group of dumbbell-shaped flux-conducting laminations 6, and an exciting coil 7 is wound about the laminations and energized by alternating current signals from supply terminals 8. Core 5 is in the form of a ring of stator flux-conducting laminations which supports four stator coils 9, 10, 11 and 12, each of which extends arcuately over substantially one quarter of the ring, and the oppositely disposed coils 9 and 11, and 10 and 12, are serially connected to form two electrical circuits having one of their terminals in common. Receiver 3 includes components similar to all of those of transmitter 1. Thus, the dumbbell-shaped receiver rotor 13 carries a rotor winding 14 energized from supply terminals 8, and the receiver stator ring core 15 has four quadrantal windings 16, 17, 18 and 19, the oppositely disposed windings 16 and 18, and 17 and 19 being serially connected. Receiver 3 differs from transmitter 1 structurally in that the receiver rotor shaft 4 supports a permanent magnet 20 for rotation with the rotor 13, the magnet 20 being disposed in proximity with the rotor 13 such that the permanent magnet field may interact with fluxes diametrically across the annular core 15.

Corresponding pairs of oppositely-disposed coils on the transmitter 1 and receiver 3 are serially coupled and their difference voltages applied to a rectifier-amplifier which produces outputs of direct currents varying in magnitude and polarity with the amplitude and phase of the applied difference voltages. Thus, transmitter coils 9 and 11 are serially coupled with receiver coils 16 and 18, their difference voltages being applied to input leads 21 of rectifier-amplifier 22. Likewise, transmitter coils 10 and 12 are serially coupled with receiver coils 17 and 19, their difference voltages being applied to input leads 23 of rectifier-amplifier 24. A.-C. fluxes emanating from the rotor core 6 of the transmitter 1 traverse the stator core 5 in opposite angular directions, through opposite halves thereof. Thus, for any unique angular orientation of the rotor, there is a unique relationship between the voltages induced in the four stator coils 9–12. The same is true of the voltages induced in the receiver stator coils 16–19 by A.-C. fluxes directed therethrough by receiver rotor core 13. When the transmitter rotor core 6 and the receiver rotor core 13 bear the same angular relationship to their stator coils, a condition existing when the transmitter and receiver rotor shafts 2 and 4 are in angular correspondence, the voltage induced in each of the transmitter stator coils 9–12 is equal to the voltages induced in the corresponding one of the receiver stator coils 16–19. And, as is fully comprehended by those acquainted with the operation of two-phase pick-offs, there is a pattern of A.-C. voltages appearing at the three output leads of each of the transmitter and receiver units which is uniquely characteristic of any predetermined orientation of the rotor of that unit.

The A.-C. difference-signals between the voltages of each of the corresponding two phases of the transmitter and receiver units are applied to the rectifier-amplifiers 22 and 24 such that an output of direct current signals characterizing in polarity and magnitude the phase and amplitude of the applied A.-C. difference-signals is obtained for each of the two phases of the units. The direct current output signals from each of the rectifier-amplifiers are applied to the receiver unit and, specifically, to the stator coils of the same phase which contributed to the input applied to the rectifier-amplifiers. That is, rectifier-amplifier 24 applies its direct current output signals across the same receiver stator coils 17 and 19 which delivered A.-C. excitation to it, and rectifier-amplifier 22 applied direct current output signals across the same receiver stator coils 16 and 18 which contributed to its A.-C. excitation. The direct currents flowing through each of the two pairs of oppositely-wound coils on the receiver stator produce diametric fields across the stator core, and the resultant diametric and unidirectional field across the stator core is angularly oriented in accordance with the relative magnitudes and polarities of its two component magnetic fields. The permanent magnet 20, rotatable with receiver rotor shaft 4 and rotor core 13, aligns itself in the angular direction of that resultant of the unidirectional diametric fields produced across the stator core. Since the A.-C. operation of the receiver unit 3 as a pick-off and its D.-C. operation as a motion-reproducing device are simultaneous, the unit 3 operates both to coerce the receiver output shaft 4 into angular correspondence with the transmitter rotor shaft and to monitor or detect the relationship therebetween continuously.

In operation, the rotor windings 7 and 14 of the transmitter and receiver are energized from the alternating voltage supply terminals 8, whereby alternating fluxes are caused to flow through the rotor cores 6 and 13 and through the stator cores 5 and 15, respectively. Provided these rotors are in angular correspondence in relation to their stators, a desired condition, the A.-C. voltage induced in the transmitter stator coils 9 and 11 is bucked by the equal and opposite voltage from the receiver stator coils 16 and 18, and transmitter stator coils 10 and 12 produce a voltage equal and opposite that of receiver stator coils 17 and 19, whereupon there are no appreciable difference voltages applied to the input leads 21 and 23 of the rectifier-amplifiers 22 and 24, and no further action takes place in the system. However, should there be a lack of angular correspondence between the transmitter and receiver rotor shafts 2 and 4, as when the former is moved and the latter is to reproduce the transmitter rotor motion, the voltages induced in the corresponding pairs of stator coils of each of the phases of the transmitter and receiver are different, and the difference voltages therebetween, of characteristic phase and amplitude for the particular lack of correspondence involved, are then fed to the input leads 21 and 23 of the rectifier-amplifier units 22 and 24. Units 22 and 24 in turn deliver outputs of direct current having polarities and magnitudes characteristic of the A.-C. input signals, and each of these direct current outputs flows through one of the two sets of coils representing one phase on the receiver stator. The D.-C. fluxes thus produced diametrically across the receiver core 15 combine into a resultant unidirectional flux angularly removed from the position of the rotor magnet 20 such that the permanent magnet and the attached rotor shaft 4 rotate in a direction which lessens the angular divergence between the positions of the transmitter and receiver rotor shafts. In this action, the receiver unit functions as a torque motor or motion reproducing device. When angular correspondence between rotor shafts 2 and 4 is restored, there is no further application of torque to the receiver magnet 20 and its attached output shaft 4. Blocking condensers 25 and 26 prevent the flow of direct current output signals from rectifier-amplifiers 22 and 24 through the two sets of coils representing the two phases of the transmitter 1, although obviously these condensers would not be essential in all embodiments of the system.

The A.-C. voltage output from each serially-coupled pair of coils representing one of the two phases of each of the transmitter and receiver units varied through one cycle of a sinusoidal pattern as the rotors 2 and 4 move through a single revolution. If the voltage patterns of both phases of the particular transmitter and receiver units employed are the same, system error, that is, the angular divergence between the orientations of the transmitter and rotor shafts, is independent of the gains of the two rectifier-amplifiers 22 and 24. This is so, in contradistinction to the characteristics of other motion reproducing systems because the final orientation of the receiver rotor magnet depends not upon exact alignment with a particular unidirectional diametric field but only upon the disappearance of a torque-producing field when the voltages from the transmitter and receiver phases are the same, which occurs when the rotors are accurately aligned. There is likewise no adverse effect on system error in the arrangements wherein it occurs that the patterns of differences between phase voltages of the transmitter and receiver are the same and wherein the amplifier gains are equal. Normally, with transmitters and receivers of good construction, the pattern of voltages for the two phases of the transmitter should be the same, and the pattern of voltages for the two phases of the receiver should be the same also, such that there are no errors when either or both of the amplifier gains and the transmitter phase voltage patterns are equal, and otherwise the maximum error is a function of the difference in amplifier gains and the differences between transmitter and receiver phase voltages. A ten per cent difference in these phase voltages and a ten per cent difference in amplifier gains combine to produce a calculable error of only a third of one degree. No error results from non-linear amplification if the voltages and amplifications for the two phases are equal. Assuming a ten per cent difference in non-linearity between amplifiers, a ten per cent difference between amplifications, and a ten per cent difference between voltages from the transmitter and receiver, the resulting system error is computed to be merely 4 degrees. It is thus apparent that system errors are kept to a minimum despite widespread variations in characteristics of the elements thereof. A further outstanding advantage of the system resides in the independence of the receiver torque-producing action from the operation of the transmitter, whereby none of the system output torque is reflected upon the input. Accordingly, the system is particularly well suited to applications wherein torques reflected on an input shaft by action of the driven output shaft controlled thereby cannot be tolerated, as is the case in systems where a gyroscope, which is extremely sensitive to torques applied thereto, controls a remote indicator or other apparatus.

The invention herein disclosed is, of course, susceptible of modification, adaptation and variation in numerous ways without resort to the inventive faculties. For example, it is not necessary that the transmitter and receiver units include rotor structures bearing windings which must be energized through slip rings. Rather, the rotor structures of these units may each comprise the well-known Z-shaped rotor of magnetic material having an annular exciting coil concentric with the center member and axis of rotation of the Z rotor. This construction permits the Z-shaped rotor to move angularly while its annular exciting winding is fixed in position in relation to the stator, and yet the annular exciting winding induces negligible voltage in the toroidal stator winding.

Thus, while a particular embodiment of this invention has been shown and described herein, it will occur to those skilled in the art that various changes and modifications can be accomplished without departing either in spirit or scope from the invention set forth in the appended claims.

What I claim as new and desire to secure by Letters Patent of the United States is:

1. In a transmission system, the combination comprising a transmitter characterizing the angular positions of a first rotatable member in alternating current signals, a receiver characterizing the angular positions of a second rotatable member in alternating current signals and simultaneously creating unidirectional flux in proximity with said second member responsive to direct current signals applied thereto, torque-applying means coupled with said second member and actuated by said unidirectional flux, and means intercoupled with said transmitter and receiver applying to said receiver said direct current signals characterized in accordance with the differences between said alternating current signals from said transmitter and receiver.

2. In a transmission system, the combination comprising a two-phase electrical transmitter characterizing angular positions of a first member in A.-C. signals, a two-phase electrical receiver unit simultaneously characterizing angular positions of a second member in A.-C. signals and creating unidirectional flux in proximity with said second member responsive to direct current signals, torque-applying means coupled with said second member and actuated by said unidirectional flux and means coupled with said receiver unit and transmitter applying to said receiver unit direct current signals characterized in magnitudes and polarities in accordance with the amplitudes and phases of the differences between said A.-C. signals from said receiver unit and transmitter.

3. In an electro-mechanical transmission system, the combination comprising a two-phase electrical transmitter having two-phase output windings in which are produced A.-C. signals characterizing the angular positions of a first member, a two-phase electrical receiver unit having two phase windings in which are produced A.-C. signals characterizing the angular positions of a second member, a permanent magnet rotatable with said second member in proximity with said receiver unit windings, rectifier means producing direct current signals characterizing the differences between said A.-C. signals from each of the corresponding phase windings of said receiver unit and transmitter, and means applying each of the direct current signals from said rectifier means to the corresponding phase winding of said receiver unit, said direct current signals applied to said receiver unit causing torques to be applied to said permanent magnet and said second member.

4. In an electro-mechanical transmission system, the combination comprising a two-phase electrical transmitter having a pair of output windings in which are produced A.-C. signals characterizing the angular positions of a first member, a two-phase electrical receiver unit having a pair of windings in which are produced A.-C. signals characteristic of the angular positions of a second member, means responsive to the differences between signals from each of the two corresponding receiver unit and transmitter phase windings to produce direct current output signals characterizing said differences, means for applying each of said direct current signals to the corresponding phase winding of said receiver unit, and permanent magnet means rotatable with said second member and positioned to have torques applied thereto responsive to direct current signals in said receiver unit windings.

5. In an electro-mechanical transmission system, the combination as set forth in claim 4 wherein said receiver unit and transmitter each comprise an annular stator core of flux-conducting material, four quadrantally positioned toroidal coils on said core, opposite coils being connected in signal opposition to form one phase winding, a flux-conducting rotor rotatable with one of said members, and a winding producing flow of alternating magnetic flux through said rotor and core, and wherein a condenser blocking flow of direct currents is in circuit with each phase winding of said transmitter.

RICHARD A. PFUNTNER.

References Cited in the file of this patent
UNITED STATES PATENTS

| Number | Name | Date |
|---|---|---|
| 2,356,186 | Somers | Aug. 22, 1944 |

FOREIGN PATENTS

| Number | Country | Date |
|---|---|---|
| 472,259 | Great Britain | Sept. 20, 1937 |
| 765,083 | France | June 1, 1934 |